Figure 1:
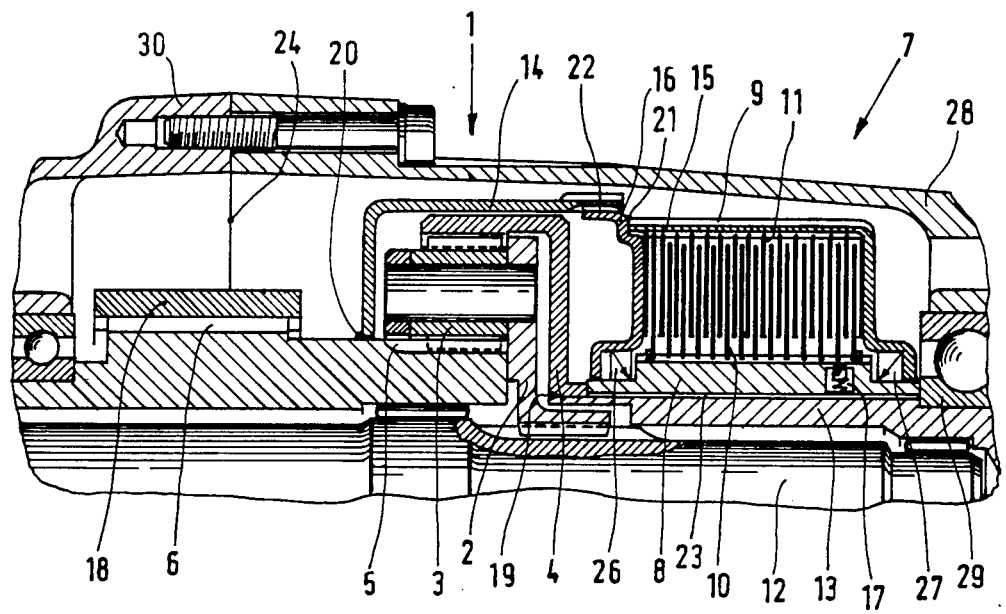

United States Patent [19]

Magg

[11] Patent Number: 4,718,300
[45] Date of Patent: Jan. 12, 1988

[54] POWER-DRIVE TRANSMISSION WITH VISCOUS CLUTCH

[75] Inventor: Alfred Magg, Friedrichshafen, Fed. Rep. of Germany

[73] Assignee: Zahnradfabrik Friedrichshafen AG, Friedrichshafen, Fed. Rep. of Germany

[21] Appl. No.: 695,367

[22] PCT Filed: Apr. 9, 1984

[86] PCT No.: PCT/EP84/00104
§ 371 Date: Jan. 23, 1985
§ 102(e) Date: Jan. 23, 1985

[87] PCT Pub. No.: WO84/04792
PCT Pub. Date: Dec. 6, 1984

[30] Foreign Application Priority Data

Jun. 1, 1983 [LU] Luxembourg ...... PCT/EP83/00140

[51] Int. Cl.⁴ ............................................. F16H 37/06
[52] U.S. Cl. ......................................... 74/705; 74/711
[58] Field of Search .......... 74/665 R, 665 F, 665 GA, 74/750 R, 705, 711, 794, 710.5; 180/247; 192/57

[56] References Cited

U.S. PATENT DOCUMENTS

| | | | |
|---|---|---|---|
| 3,760,922 | 9/1973 | Rolt et al. | 74/710.5 |
| 3,923,113 | 12/1975 | Pagdin | 192/57 X |
| 4,022,084 | 5/1977 | Pagdin | 74/711 |
| 4,031,780 | 6/1977 | Dolan et al. | 74/711 |
| 4,040,271 | 8/1977 | Rolt et al. | 74/711 X |
| 4,063,470 | 12/1977 | Kelbel | 74/750 R |
| 4,369,671 | 1/1983 | Matsumoto et al. | 74/665 GA |
| 4,458,557 | 7/1984 | Hayakawa | 74/705 X |

FOREIGN PATENT DOCUMENTS

| | | | |
|---|---|---|---|
| 985067 | 3/1974 | Canada | 74/711 |
| 2135791 | 4/1976 | Fed. Rep. of Germany . | |
| 1252753 | 11/1971 | United Kingdom . | |
| 1411283 | 10/1975 | United Kingdom . | |

OTHER PUBLICATIONS

Automotive Engineer, Apr./May 1981, "FF Developments Poised for OE Expansion", see p. 28, FIG. 12a.

Primary Examiner—Leslie Braun
Assistant Examiner—David Novais
Attorney, Agent, or Firm—Hayes, Davis & Soloway

[57] ABSTRACT

A power-drive transmission (1) with viscous clutch (7) between the hollow wheel (6) and the sun wheel (5) of the front-wheel planetary gear (1). The front wheel planetary gear (1) is axially situated between the take-off wheel (6) and the clutch (7). The sun wheel (5) and the take-off wheel (6) form together a single structural part. Many structural parts are produced substantially without cutting either (5,6,8) by sintering, casting or cold recasting or (4,14,15,16) by sheet-metal recasting technology. The viscous clutch (7) becomes a cheap, easily assemblable exchange part which, filled with silicon oil and functionally tested, is prepared as spare part ready for installation.

7 Claims, 2 Drawing Figures

POWER-DRIVE TRANSMISSION WITH VISCOUS CLUTCH

The invention relates to a distributor transmission having the following features:

the distributor transmission is a spur-gear planetary transmission having a planetary carrier, planetary gears, a ring gear and a sun gear;
a drive shaft drives the planetary carrier;
the planetary carrier drives the ring gear and the sun gear via the planetary gears;
the ring gear drives an output shaft;
the sun gear drives an output gear;
a viscous clutch connects the ring gear with the sun gear;
the viscous clutch has a hollow shaft and a casing;
the hollow shaft carries inner discs in an outer drag section;
the casing carries outer discs in an inner drag section;
the viscouse clutch is substantially filled with a high viscosity silicon oil.

Distributors transmissions of this kind are known already (DE-AS 21 35 791, U.S. Pat. No. 3,760,922, Canadian Pat. No. 985,067, U.S. Pat. Nos. 4,022,084, 4,040,271) as central differential transmissions for motor vehicles having two continuously driven axles. In most of these known distributor transmissions the viscous clutch is situated axially between the output gear designed as chain gear and the planetary transmission. This arrangement offers the lowest cost of construction. Only in the distributor transmission according to Canadian Pat. No. 985,067 is the viscous clutch situated radially outside the planetary transmission with the advantage that with a small total length of the whole distributor transmission the viscous clutch attains a specially great torque with its large diameter.

In all these structures the planetary transmission must be wholly or partly removed during repair works.

The problem on which the invention is based is to design a distributor transmission of this kind in a manner such that the viscose clutch can be dismounted and mounted during repair works without it being also necessary to dismount parts of the planetary transmission.

According to the invention, there is provided a distributor transmission having the following features:

said distributor transmission (1) is a spur-gear planetary transmission having a planetary carrier (2), planetary gears (3), a ring gear (4) and a sun gear (5);
an input shaft (12) drives said planetary carrier (2);
said planetary carrier (2) drives said ring gear (4) and said sun gear (5) via said planetary gears (3);
said ring gear (4) drives an output shaft (13);
said sun gear (5) drives an output gear (6);
a viscous clutch (7) connects said ring gear (4) with said sun gear (5);
said viscous clutch (7) has a hollow shaft (8) and a casing (9);
said hollow shaft (8) carries inner discs (10) in an outer drag section;
said casing (9) carries outer discs (11) in an inner drag section;
said viscous clutch (7) is substantially filled with a high-viscosity silicon oil, characterized by the following features:

said planetary transmission (1) is axially situated between said output gear (6) and said viscous clutch (7);
a coupling pan (14) overlaps said ring gear (4) and connects said sun gear (5) with said casing (9);
a drag section (22) torsion-proof and axially movably connects said casing (9) with said coupling pan (14);
a drag section (23) torsion-proof and axially movably connects said ring gear (8) with said output shaft (13);
a bearing (29) in a housing part (28) axially holds said viscous clutch (7). This solves the aforesaid problem since the viscous clutch can be axially withdrawn as a complete assembly from the drag section of the coupling pans and from the spline section of the output shaft as soon as a part of the housing has been removed with a support. It is also possible just as simply to mount again the viscose clutch or a new viscous clutch as complete, functionally tested assembly. The repair works are thereby made simpler and easier.

The cost of production, the installation and the operation are still further reduced by the other features of the invention namely:

manufacture in sufficient quantities without cutting results in the lowest expenses;
a multi-disc chain with discs having involute teeth needs for the transmission of the same power smaller chain gears with smaller peripheral speed, thus producing less grinding losses than a roller chain;
a multi-disc chain with movable links also produces specially low losses due to link friction;
a common tooth shape is cheaper than two different tooth shapes on the same structural part;
a welded seam is cheaper than any other compact connection of two housing parts.

Figure 2:
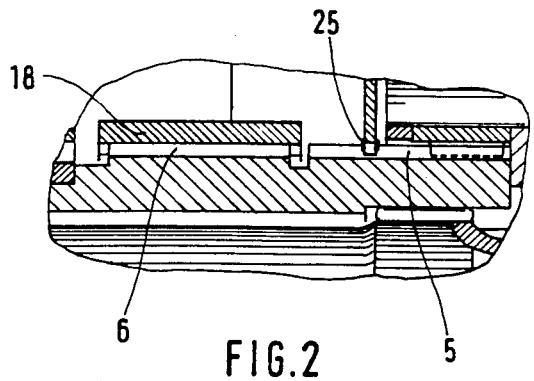

FIG. 1 and FIG. 2 of the drawing show as segments of a longitudinal section two embodiments of distributor transmissions according to the invention.

A drive shaft 12 drives a planetary carrier 2 of a spur-gear planetary transmission 1. The planetary carrier 2 carries planetary gears 3 and drives, via said planetary gears 3, a ring gear 4 and a sun gear 5. The ring gear 4 drives an output shaft 13 and is firmly connected with the output shaft 13 via a welded seam 19. The sun gear 5 drives an output gear 6. The sun gear 5 and the output gear 6 are made of one piece and substantially produced without cutting by casting, sintering or cold molding.

A viscous clutch 7 has a ring gear 8 and a casing 9. The ring gear 8 carries inner discs 10 in an outer spline section. The casing 9 carries outer discs 11 in an inner spline section. The casing 9 has a pan 15 and a cap 16 firmly and tightly connected with each other by a welded seam 21. Gaskets 26, 27 in the casing 9 slide upon the ring gear 9. The viscous clutch 7 is substantially filled with high-viscosity silicon oil.

A welded seam 20 (FIG. 1) of a drag section 25 having axially securing rings (FIG. 2) firmly connects a coupling pan 14 with the sun gear 5. A spline section 22 torsion-proof and axially movably connects the coupling pan 14 with the casing 9. A spline section 23 torsion-proof and axially movably connects the ring gear 8 with the output shaft 13. A joint 24 of the housing separates a housing 30 from a housing part 28 with a bearing 29 for the output shaft 13. As soon as the part 28 of the housing with the bearing 29 are removed, the viscous clutch 7 can be axially withdrawn as a complete assembly from the spline sections 22, 23. At a small cost said clutch or a new viscous clutch 7 can again by inserted in the spline sections 22, 23.

The output gear 6 drives a multi-disc chain 18 with movable links and with discs having involute teeth. The tooth shapes of the output gear 6 and the sun gear 5 can be different or identical (FIG. 2).

A pressure control valve 17 in the hollow shaft 13 protects the casing 9 against damages by overpressure in the viscous clutch 7.

The planetary transmission 1 serves as central differential gear for a motor vehicle and distributes the power of a drive engine to two driven axles.

I claim:

1. In a distributor transmission comprising:
   a spur-gear planetary transmission having a planetary carrier (2), planetary gears (3), a ring gear (4) and a sun gear (5);
   an input shaft (12) drives said planetary carrier (2);
   said planetary carrier (2) drives said ring gear (4) and said sun gear (5) via said planetary gears (3);
   said ring gear (4) drives an output shaft (13);
   said sun gear (5) drives an output gear (6);
   a viscous clutch (7) connects said ring gear (4) with said sun gear (5);
   said viscous clutch (7) has a hollow shaft (8) and a casing (9);
   said hollow shaft (8) carries inner discs (10) in an outer spline section;
   said casing (9) carries outer discs (11) in an inner spline section;
   said viscous clutch (7) is substantially filled with a high-viscosity silicon oil, the improvement wherein
   said planetary transmission (1) is axially situated between said output gear (6) and said viscous clutch (7);
   a coupling pan (14) overlies said ring gear (4) and connects said sun gear (5) with said casing (9);
   a spline section (22) torsion-proof and axially movably connects said casing (9) with said coupling pan (14);
   a spline section (23) torsion proof and axially movably connects said ring gear (4) with said output shaft (13);
   a bearing (29) in a housing part (28) axially holds said viscous clutch (7); and
   when said housing part (28) and said bearing (29) are disconnected, the viscous clutch (7) can be axially removed as a complete assembly to provide easy maintenance and replacement of the viscous clutch.

2. A distributor transmission according to claim 1 having the following feature:
   said sun gear (5) and said output gear (6) are made of one piece and are substantially produced without cutting by casing, sintering or cold molding.

3. A distributor transmission according to claim 2 having the following feature:
   said output gear (6) drives a multiple-disc chain (18) having movable links and discs having involute teeth.

4. A distributor transmission according to claim 3 having the following feature:
   said sun gear (5) and said output gear (6) have a common tooth shape matching the teeth of said planetary gears (3) and the teeth of said multiple-disc chain (18).

5. A distributor transmission according to claim 1 having the following feature;
   said hollow shaft (8) is produced substantially without cutting by casting, sintering or cold molding.

6. A distributor transmission according to claim 1 having the following features:
   said casing (9) comprises a pain (15) and a cap (16) which are not tightly welded together until said viscous clutch (7) has been assembled;
   gaskets (26,27) in said casing (9) slide upon said hollow shaft (8).

7. A distributor transmission according to claim 6 having the following feature:
   said pain (15) and said cap (16) of said casing (9) and said coupling pan (14) are sheet metal recast parts with drag sections shaped without cutting for the connection (22) between said coupling pan (14) and said casing (9) and for the connection between said casing (9) and said outer discs (11).

* * * * *

UNITED STATES PATENT AND TRADEMARK OFFICE
CERTIFICATE OF CORRECTION

PATENT NO. : 4,718,300

DATED : JANUARY 12, 1988

INVENTOR(S) : Alfred MAGG

It is certified that error appears in the above—identified patent and that said Letters Patent is hereby corrected as shown below:

Column 4, line 33, delete "pain" and insert --pan--.

Column 4, line 40, delete "pain" and insert --pan--.

Signed and Sealed this

Twenty-sixth Day of July, 1988

Attest:

DONALD J. QUIGG

Attesting Officer

Commissioner of Patents and Trademarks